(12) United States Patent
Wong

(10) Patent No.: US 9,173,524 B2
(45) Date of Patent: Nov. 3, 2015

(54) SPECIAL PEDESTAL FOR FOOD PROCESSOR

(76) Inventor: Yan Kwong Wong, Kowloon (CN)

( * ) Notice: Subject to any disclaimer, the term of this patent is extended or adjusted under 35 U.S.C. 154(b) by 606 days.

(21) Appl. No.: 13/591,221

(22) Filed: Aug. 22, 2012

(65) Prior Publication Data

US 2013/0048770 A1    Feb. 28, 2013

(30) Foreign Application Priority Data

Aug. 26, 2011    (CN) .......................... 2011 2 0315491

(51) Int. Cl.
*B24B 41/00* (2006.01)
*A47J 43/07* (2006.01)

(52) U.S. Cl.
CPC .......... *A47J 43/0705* (2013.01); *A47J 43/0727* (2013.01)

(58) Field of Classification Search
CPC .... A47J 43/07; A47J 43/0727; Y10T 403/64; Y10T 403/7005; Y10T 403/7007; Y10T 403/7011
USPC ................. 241/100, 285.1; 403/349
See application file for complete search history.

(56) References Cited

U.S. PATENT DOCUMENTS

| 1,930,948 | A | * | 10/1933 | Brewer ......................... 366/314 |
| 3,786,999 | A | * | 1/1974 | Cabell ........................ 241/282.1 |
| 4,422,343 | A | * | 12/1983 | Falkenbach et al. .............. 74/16 |
| 5,404,614 | A | * | 4/1995 | Stephens ...................... 15/327.2 |
| 5,660,493 | A | * | 8/1997 | Stephens ...................... 403/348 |
| 6,318,683 | B1 | * | 11/2001 | Savoy ........................... 248/146 |
| 6,715,706 | B1 | * | 4/2004 | Planca et al. .................... 241/36 |
| 6,889,924 | B2 | * | 5/2005 | Pavlovic et al. ............. 241/37.5 |
| 2006/0285428 | A1 | * | 12/2006 | Paradise et al. ............... 366/130 |
| 2013/0140753 | A1 | * | 6/2013 | Blagotinsek et al. ......... 269/309 |

FOREIGN PATENT DOCUMENTS

WO    WO 2006138335 A2 * 12/2006    ............. A47G 19/10

* cited by examiner

*Primary Examiner* — Shelley Self
*Assistant Examiner* — Leonel Vasquez

(57) ABSTRACT

The present invention provides a pedestal for a food processor, which includes a container, a base arranged under the bottom of the container, a locking assembly configured for locking the container on the base. The locking assembly includes block holes arranged in the base, block grooves arranged in the bottom of the container, and a chuck rotatably arranged on the bottom of the base. The chuck has snap-gauges cooperating with the block grooves passing through the block holes respectively. When uninstalling, it only needs to rotate the chuck to complete the uninstalling operation, and thus the operation is very convenient. When replacing the food processor, it only needs to take down the container and other components of various food processors which cooperate with the container, and does not need to replace the base. Thus the present invention can rapidly replace different food processors.

8 Claims, 8 Drawing Sheets

SPECIAL PEDESTAL FOR FOOD PROCESSOR

FIELD OF THE INVENTION

The present invention relates to a component of kitchen utensils, and more particularly to a special pedestal for a food processor.

BACKGROUND OF THE INVENTION

In kitchen utensils, a food processor is widely used. People generally use the food processor to cut up food, specially, to cut up fruit, vegetable, etc., into pieces, such that the people may further process or edible them. Currently, various food processors are sold in market, and each of the food processors includes a container for collecting the food, and equips a pedestal under the bottom of the container for fixing the container on the table and preventing the container sliding in operation. When working in the kitchen, people generally need to use various food processors. It should assemble a corresponding pedestal when replacing the food processor once, thus it is very inconvenient in use.

SUMMARY OF THE INVENTION

The present invention relates a pedestal for a food processor, which is suitable for various food processors, and can be rapidly replaced from the food processors, thus solves the problem of the conventional technology which is inconvenient in operation to replace the different base for replacing the food processor.

The present invention provides a pedestal for a food processor, which comprises a container, a base arranged under the bottom of the container, and a locking assembly configured for locking the container on the base. The locking assembly comprises a plurality of block holes arranged in the base, a plurality of block grooves arranged in the bottom of the container, and a chuck rotatably arranged on the bottom of the base. The chuck has a plurality of snap-gauges which cooperate with the block grooves that passing through the block holes respectively.

In an exemplary embodiment of the present invention, a plurality of legs passing through the block holes respectively are arranged under the bottom of the container, and the block grooves are arranged in the legs respectively.

In an exemplary embodiment of the present invention, a locating ring is arranged under the bottom of the container, and an annular groove is arranged in the base for cooperating with the locating ring. The legs are arranged in an inner side of the locating ring, and the block holes are arranged in an inner side of the annular groove.

In an exemplary embodiment of the present invention, a locating central column is arranged in the center of the base, and a locating central hole is arranged in the bottom of the container for rotatably cooperating with the locating central column.

In an exemplary embodiment of the present invention, a locating rotation shaft is arranged between the base and the chuck, such as to rotatably connect the base with the chuck.

In an exemplary embodiment of the present invention, a central axle hole is arranged in the center of the base, a through hole is arranged in the center of the chuck, and a locating rotation shaft is rotatably arranged in the central axle hole and the through hole to rotatably connect the base with the chuck.

In an exemplary embodiment of the present invention, a locating boss is arranged on one end of the locating rotation shaft for cooperating with the central axle hole, and an elastic jaw is arranged on another opposite end of the locating rotation shaft for cooperating with the through hole.

In an exemplary embodiment of the present invention, a handle hole is arranged in a side of the base, a handle is arranged on the chuck, and the handle passes through the handle hole and extends out of the base.

In an exemplary embodiment of the present invention, the handle comprises a connecting portion connecting with the chuck, and a handle sleeve passing through the handle hole and detachably connecting with the connecting portion.

In an exemplary embodiment of the present invention, a locating column is arranged on the bottom of the base, and a locating groove is arranged in a side of the handle towards the base for cooperating with the locating column.

In an exemplary embodiment of the present invention, a sucker is arranged under the bottom of the base.

The pedestal for the food processor of the present invention has the following advantages: since the locking assembly comprises the block holes, the block grooves and the chuck having the snap-gauges, the base is arranged under the bottom of the container, and the block grooves pass through the block holes to cooperate with the snap-gauges respectively. When the chuck rotates in relation to the base, the snap-gauges are able to be inserted into the block grooves, such as to lock the container on the base. When the chuck reversely rotates, the snap-gauges are able to be taken down from the block grooves, such that the container may be taken down from the base. When uninstalling, it only needs to rotate the chuck to complete the uninstalling operation, and thus the operation is very convenient. When replacing the food processor, it only needs to take down the container and other components of various food processors which cooperate with the container, and does not need to replace the base. Thus the present invention can rapidly replace different food processors.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
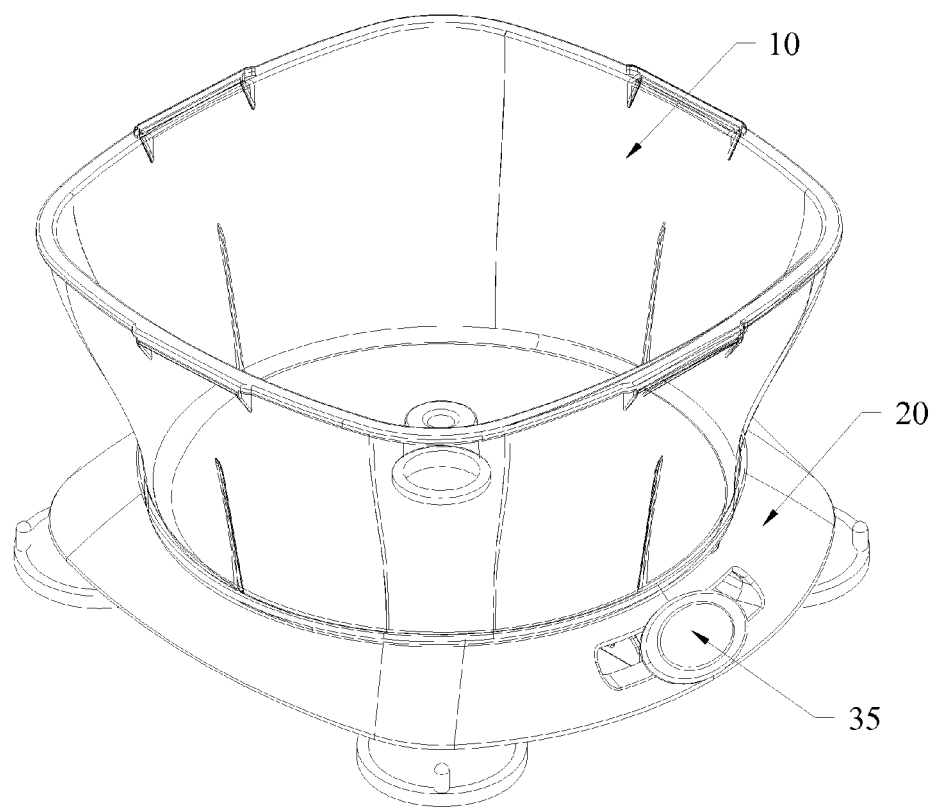
FIG. 1 is a perspective view of a pedestal for a food processor in accordance with an exemplary embodiment of the present invention.
Figure 2:
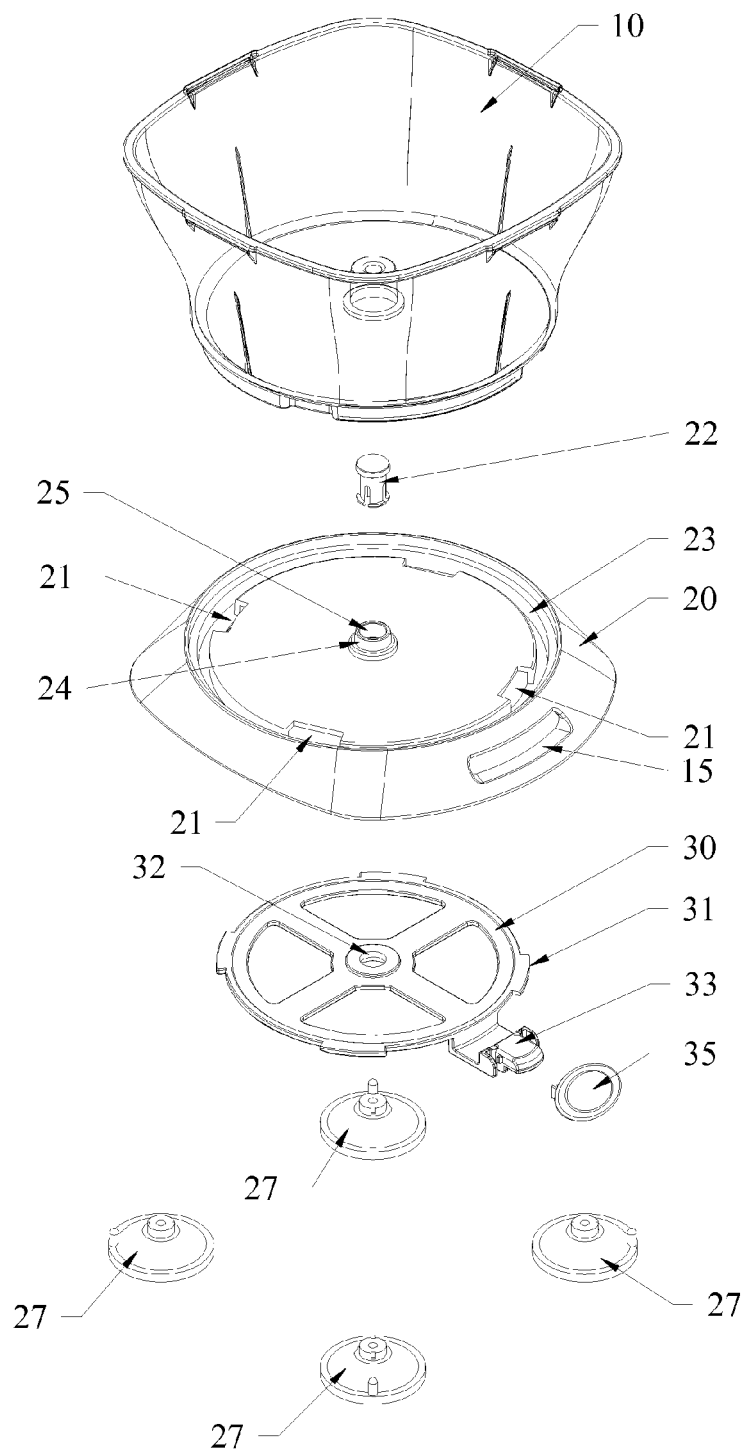
FIG. 2 is an explode view of the pedestal for a food processor in accordance with the exemplary embodiment of the present invention.
Figure 2A:
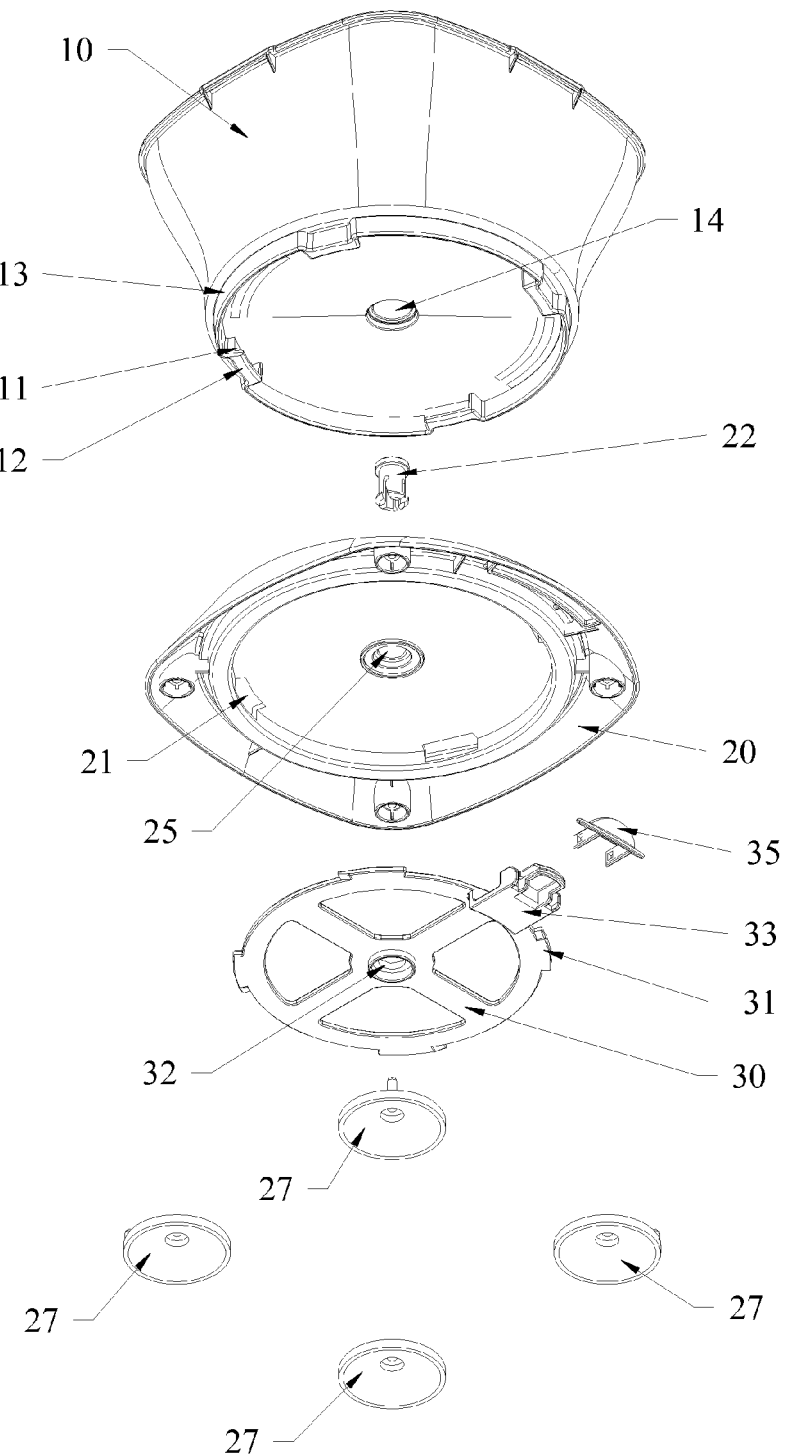
FIG. 2a is another explode view of the pedestal for a food processor in accordance with the exemplary embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As shown in FIGS. 1, 2, 2a, 3a, 3b, in an exemplary embodiment of the present invention, a special pedestal for a food processor comprises a container 10, a base 20, and a locking assembly. The base 20 is arranged under the bottom of the container 10, and the locking assembly is configured for locking the container 10 on the base 20. The locking assembly comprises a plurality of block holes 21 arranged in the base 20, a plurality of block grooves 11 arranged in the bottom of the container 10, and a chuck 30 rotatably arranged on the bottom of the base 20. The chuck 30 has a plurality of snap-gauges 31 arranged thereon, and the block grooves 11 are able to pass through the block holes 21 to cooperate with the snap-gauges 31 respectively, such that the snap-gauges 31 may be inserted into the block grooves 11 respectively, to lock the container 10 on the base 20.

In detail, a plurality of legs are arranged under the bottom of the container 10, the legs 12 are able to pass through the block holes 21 of the base 20 respectively, and the block grooves 11 are arranged in the legs 12 respectively. To conveniently locate the container 10 on the base 20, preferably, a locating ring 13 is arranged under the bottom of the container 10, and an annular groove 23 is arranged in the base 20. The locating ring 13 cooperates with the annular groove 23, to locate the container 10 on the base 20, such as to fast perform the locating operation, and conveniently perform the installing operation. At the moment, the legs 12 may be arranged in the inner side of the locating ring 13, that is, the locating ring 13 protrudes to the center thereof, to form the legs 12. Correspondingly, the block holes 21 are arranged in the inner side of the annular groove 23, that is, the block holes 21 are formed in walls of the annular groove 23 adjacent to the center. Preferably, a sucker 27 is arranged under the bottom of the base 20, to conveniently locate the base 20 on the working table, such as to prevent the whole food processor sliding when processing food.

Figure 4:
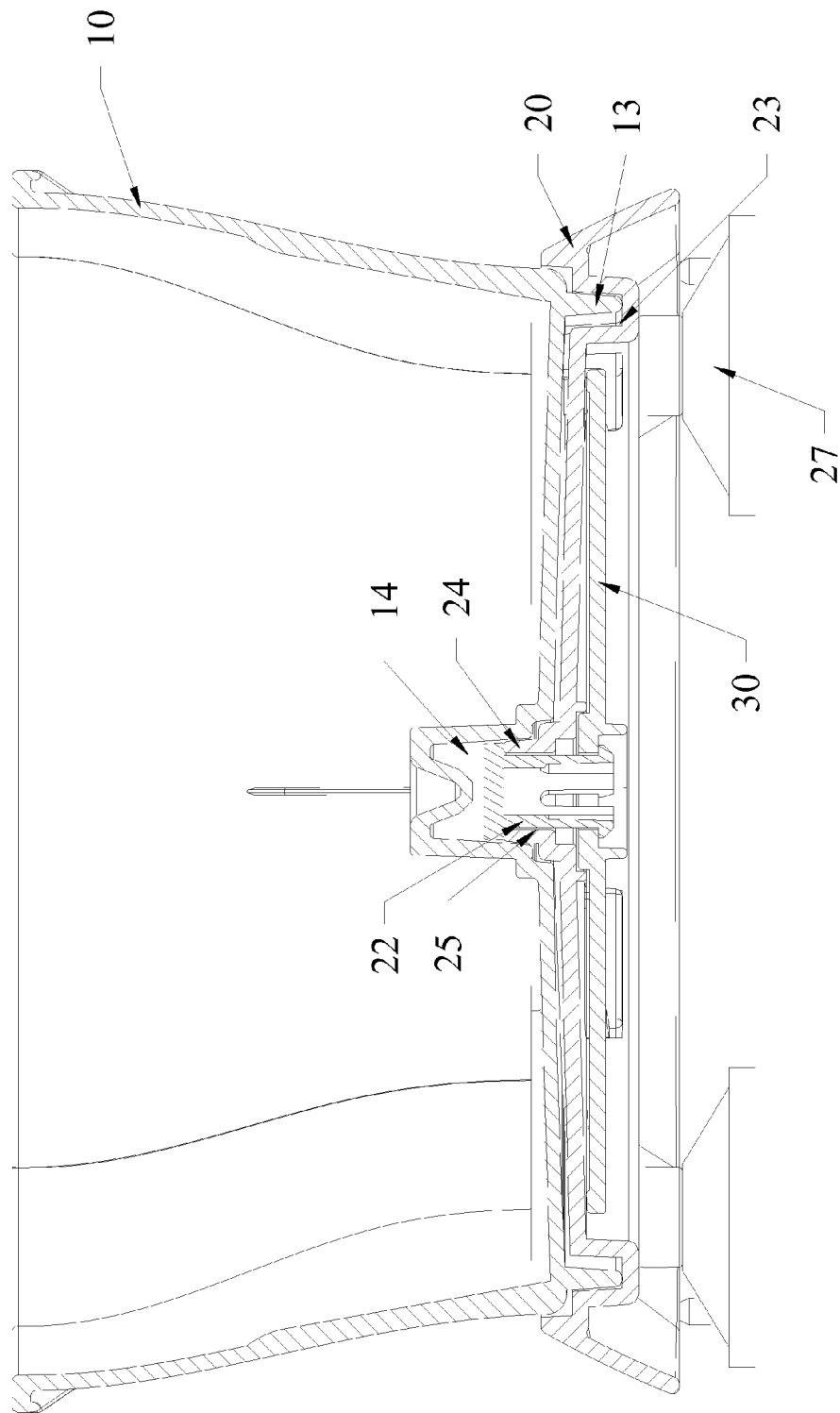
FIG. 4 is a cross-sectional view of the pedestal for a food processor in accordance with the exemplary embodiment of the present invention.

As shown in FIG. 4, a locating central hole 14 is arranged in the bottom of the container 10, a locating central column 24 is arranged in the center of the base, and the locating central column 24 cooperates with the locating central hole 14, to further reliably locate the container 10 on the base 20.

Figure 3A:
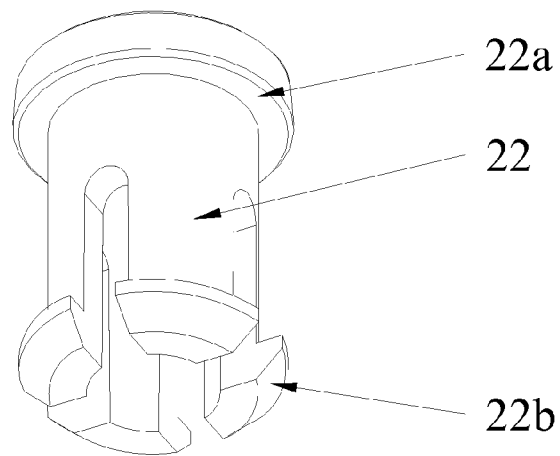
FIG. 3a is a perspective view of a locating rotation shaft of the pedestal for a food processor in accordance with the exemplary embodiment of the present invention.
Figure 3B:
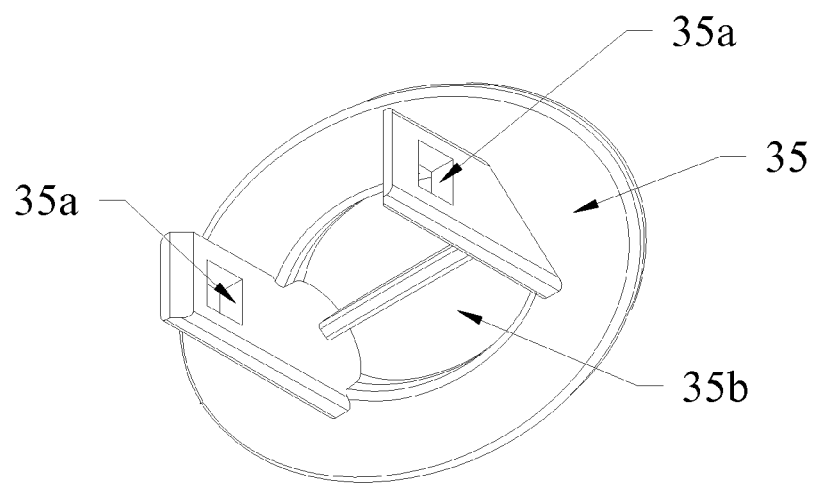
FIG. 3b is a perspective view of a handle sleeve of the pedestal for a food processor in accordance with the exemplary embodiment of the present invention.
Figure 3C:
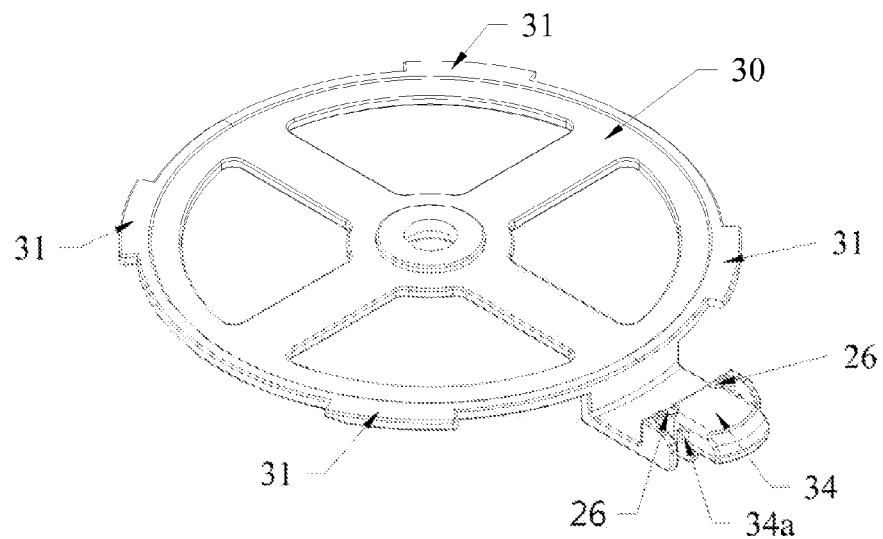
FIG. 3c is a perspective view of a chuck of the pedestal for a food processor in accordance with the exemplary embodiment of the present invention.
Figure 3D:
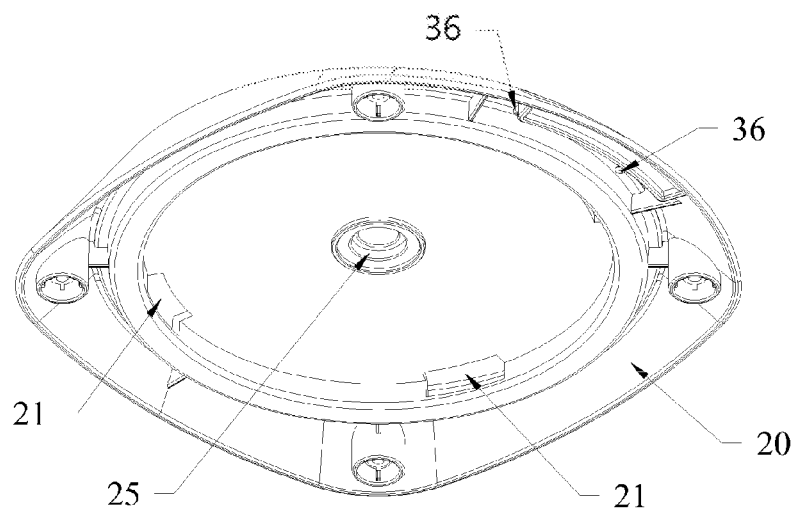
FIG. 3d is a perspective view of a base of the pedestal for a food processor in accordance with the exemplary embodiment of the present invention.

In order to realize the rotation of the chuck 30 in relation to the base 20, preferably, a locating rotation shaft 22 is arranged between the base 20 and the chuck 30, such that the locating rotation shaft 22 rotatably connects the base 20 with the chuck 30. In detail, as shown in FIGS. 3a, 3c, 3d, a central axle hole 25 is arranged in the center of the base 20, a through hole 32 is arranged in the center of the chuck 30, and the locating rotation shaft 22 passes through the central axle hole 25 and the through hole 32, to rotatably connect the base 20 with the chuck 30. As shown in FIG. 3a, preferably, the locating rotation shaft 22 has a locating boss 22a arranged on one end thereof, and an elastic jaw 22b arranged on another opposite end. When installing, the end of the locating rotation shaft 22 having the elastic jaw 22b, inserts into the central axle hole 25 and the through hole 32 in sequence, the locating boss 22a cooperates with the central axle hole 25 of the base 20, to prevent the locating rotation shaft 22 still moving downwards. Another end of the locating rotation shaft 22 having the elastic jaw 22b releases after passing through the through hole 32, and fastens in the end of the through hole 32 of the chuck 30, to prevent the locating rotation shaft 22 moving upwards, such as to rotatably connect the chuck 30 with the base 20.

To conveniently rotate the chuck 30, preferably, a handle hole 15 is formed in a side of the base 20, and a handle 33 is formed on the chuck 30. When the chuck 30 is rotatably arranged on the base 20, the handle 33 is able to pass through the handle hole 15 to extend out of the base 20, such as to pull the handle 33 out of the base 20 by the hand, for driving the chuck 30 to rotate, for uninstalling the container 10. As shown in FIGS. 3b, 3c, preferably, the handle 33 comprises a connecting portion 34 and a handle sleeve 35. The connecting portion 34 connects with the chuck 30 and extends adjacent to the handle hole 15 of the base 20, such that the handle sleeve 35 is able to pass through the handle hole 15 to connect with the connecting portion 34, for being conveniently installed. In detail, a fastener 34a is arranged on one end of the connecting portion 34 adjacent to the handle hole 15, and a fastening hole 35a is arranged on the handle sleeve 35 and protruding to the connecting portion 34. When the fastening hole 35a passes through the handle hole 15 to fasten the fastener 34a, the handle sleeve 35 is connected with the end of the connecting portion 34. To conveniently locate, preferably, a groove 35b is arranged in a side of the handle sleeve 35 towards the connecting portion 34, for receiving the end of the connecting portion 34.

Figure 5A:
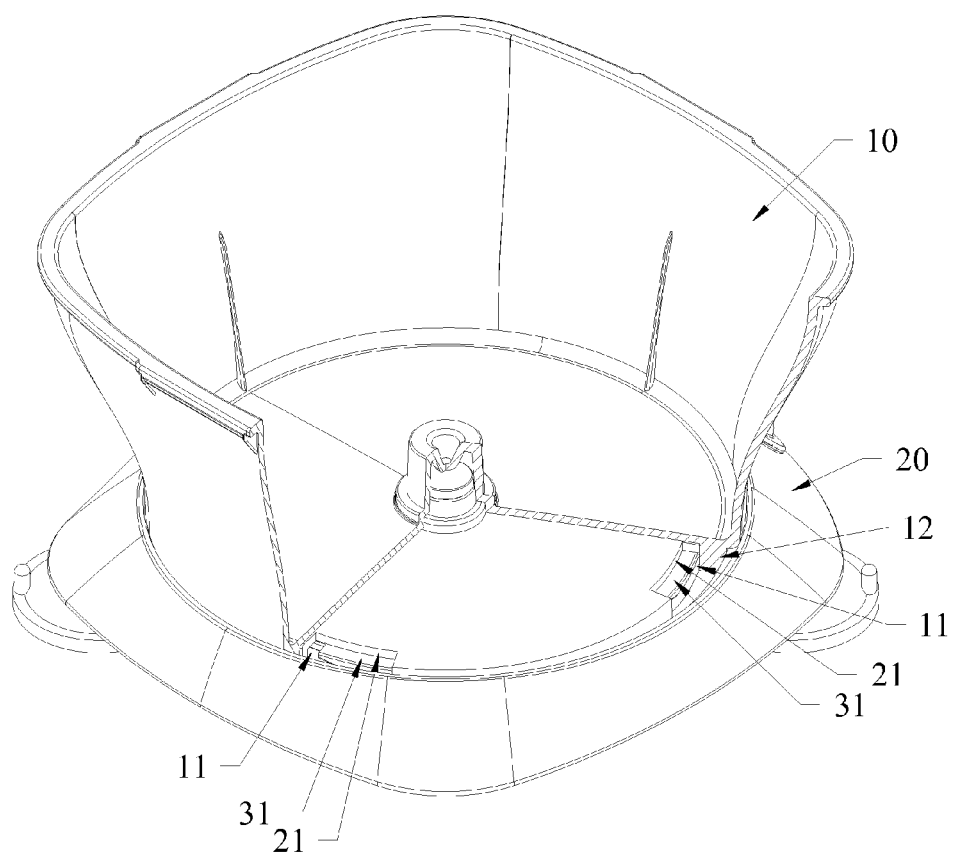
FIG. 5a is a structure view when snap-gauges of the chuck inserting into block grooves of a container of the pedestal for a food processor in accordance with the exemplary embodiment of the present invention.
Figure 5B:
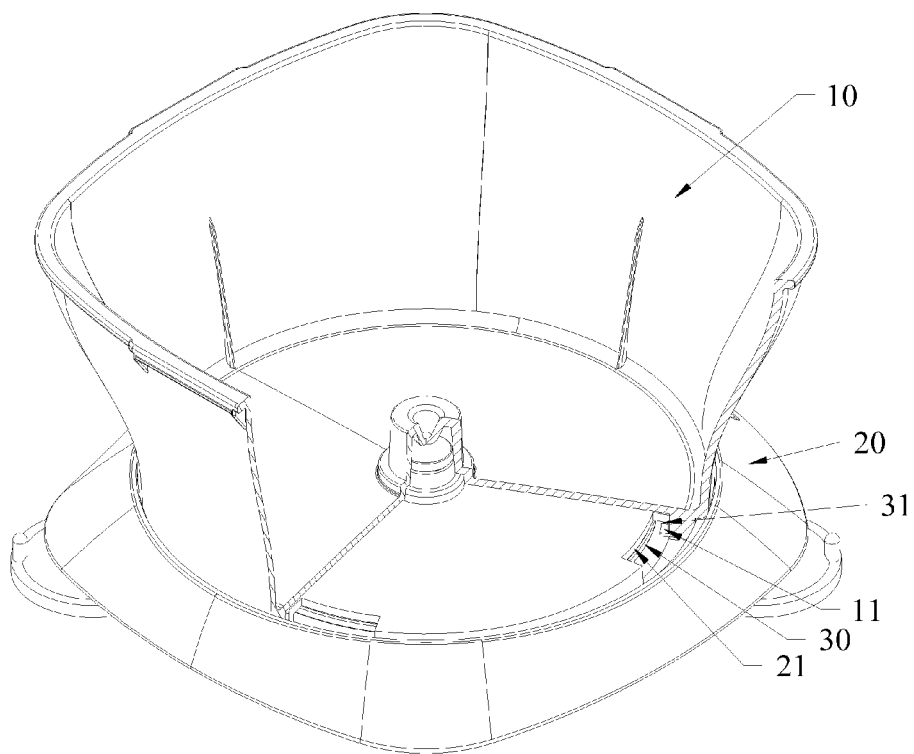
FIG. 5b is a structure view when the snap-gauges of the chuck taking down from the block grooves of the container of the pedestal for a food processor in accordance with the exemplary embodiment of the present invention.

To prevent the chuck 30 rotating in relation to the base 20 when processing the food such that the locking assembly is invalid, preferably, a locating column 26 and a locating groove 36 which cooperate with each other, are arranged between the base 20 and the handle 33. The locating column 26 may be arranged on the bottom of the base 20, and the locating groove 36 may be arranged in a side of the handle 33 towards the base 20. After snap-gauges 31 of the chuck 30 are inserted into the block grooves 11 of the container 10, the locating column 26 fastens into the locating groove 36 to prevent the chuck 30 rotating in relation to the base, such that the snap-gauges 31 may be reliably inserted into the block grooves 11 respectively. In detail, two locating columns 26 may be arranged on the bottom of the base 20, which are a left locating column 26 and a right locating column 26 respectively. Correspondingly, two locating grooves 36 may be arranged in the handle 33, which are a left locating groove 36 and a right locating groove 36. As shown in FIG. 5a, when the handle 33 drives the chuck 30 to rotate such that the snap-gauges 31 are completely inserted into the block grooves 11 respectively, the left locating column 26 exactly fastens in the left locating groove 36 such that the container 10 is reliably fixed on the base 20. As shown in FIG. 5b, when the handle 33 drives the chuck to reversely rotate such that the snap-gauges 31 are completely separated from the block grooves 11, the right locating column 26 exactly fastens in the right locating groove 36 such that the container 10 may be taken down from the base 20.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pedestal for a food processor, comprising:
   a container;
   a base arranged under the bottom of the container; and
   a locking assembly configured for locking the container on the base;
   wherein the locking assembly comprises:
      a plurality of block holes arranged in the base;
      a plurality of block grooves arranged in the bottom of the container; and
      a chuck rotatably arranged on the bottom of the base, the chuck having a plurality of snap-gauges, the block grooves being able to pass through the block holes to cooperate with the snap-gauges respectively;
      wherein a plurality of legs are arranged under the bottom of the container, the legs being able to pass through the block holes of the base respectively, the block grooves being arranged in the legs respectively;
      wherein a central axle hole is arranged in the center of the base, a through hole being arranged in the center of the chuck, a locating rotation shaft being arranged between the base and the chuck and being rotatably arranged in the central axle hole and the through hole to rotatably connect the base with the chuck.

2. The pedestal according to claim 1, wherein a locating ring is arranged under the bottom of the container, and an annular groove is arranged in the base for cooperating with the locating ring; the legs are arranged in an inner side of the locating ring, and the block holes are arranged in an inner side of the annular groove.

3. The pedestal according to claim 1, wherein a locating central column is arranged in the center of the base, and a locating central hole is arranged in the bottom of the container for rotatably cooperating with the locating central column.

4. The pedestal according to claim 1, wherein a locating boss is arranged on one end of the locating rotation shaft for cooperating with the central axle hole, and an elastic jaw is arranged on another opposite end of the locating rotation shaft for cooperating with the through hole.

5. The pedestal according to claim 1, a handle hole is arranged in a side of the base, a handle is arranged on the chuck, and the handle passes through the handle hole and extends out of the base.

6. The pedestal according to claim 5, wherein the handle comprises a connecting portion connecting with the chuck, and a handle sleeve passing through the handle hole and detachably connecting with the connecting portion.

7. The pedestal according to claim 5, wherein a locating column is arranged on the bottom of the base, and a locating groove is arranged in a side of the handle towards the base for cooperating with the locating column.

8. The pedestal according to claim 1, wherein a sucker is arranged under the bottom of the base.

* * * * *